United States Patent
Janecke

Patent Number: 6,157,886
Date of Patent: Dec. 5, 2000

[54] METHOD/SYSTEM FOR CONTROLLING UPSHIFTING IN AN AUTOMATED MECHANICAL TRANSMISSION SYSTEM

[75] Inventor: Daniel P. Janecke, Kalamazoo, Mich.

[73] Assignee: Eaton Corporation, Cleveland, Ohio

[21] Appl. No.: 09/145,316

[22] Filed: Aug. 31, 1998

[51] Int. Cl.$^7$ ............................................. G06F 7/00
[52] U.S. Cl. ..................... 701/55; 701/53; 701/54; 701/57; 701/62; 477/108; 477/115
[58] Field of Search ..................... 701/51, 53, 54, 701/55, 62, 64, 57; 477/180, 181, 176, 115, 906, 908, 108, 110, 120, 43

[56] References Cited

U.S. PATENT DOCUMENTS

| | | | |
|---|---|---|---|
| 4,258,591 | 3/1981 | Eckert et al. | 477/125 |
| 4,361,060 | 11/1982 | Smyth | 477/78 |
| 4,551,802 | 11/1985 | Smyth | 701/55 |
| 4,595,986 | 6/1986 | Daubenspeck et al. | 701/51 |
| 4,599,917 | 7/1986 | Leorat et al. | 477/120 |
| 4,838,125 | 6/1989 | Hamano et al. | 701/56 |
| 4,852,006 | 7/1989 | Speranza | 701/55 |
| 4,916,979 | 4/1990 | Irwin | 477/94 |
| 4,947,331 | 8/1990 | Speranza | 701/55 |
| 4,996,893 | 3/1991 | Nakamura et al. | 477/120 |
| 5,053,963 | 10/1991 | Mack | 701/53 |
| 5,362,286 | 11/1994 | Satoh et al. | 477/115 |
| 5,406,861 | 4/1995 | Steeby | 74/336 R |
| 5,409,432 | 4/1995 | Steeby | 477/71 |
| 5,474,508 | 12/1995 | Kondo et al. | 477/143 |
| 5,529,548 | 6/1996 | Mack | 477/84 |
| 5,882,277 | 3/1999 | Iizuka | 701/52 |

*Primary Examiner*—Jacques H. Louis-Jacques
*Attorney, Agent, or Firm*—Howard D. Gordon

[57] ABSTRACT

A control system/method to minimize unwanted upshifts in an automated mechanical transmission system (12). Upshifts are prohibited unless throttle position (THL) has achieved a substantially steady-state value ($|(d/dt(THL))|$<REF-1) or a speed value (ES, IS, OS) exceeds a reference (OS<REF-2).

10 Claims, 3 Drawing Sheets

METHOD/SYSTEM FOR CONTROLLING UPSHIFTING IN AN AUTOMATED MECHANICAL TRANSMISSION SYSTEM

BACKGROUND OF THE INVENTION

1. Field of the Invention

The present invention relates to improved shift logic for an automated vehicular mechanical transmission system. In particular, the present invention relates to a control method/system having logic rules whereby at least certain upshifts are commanded only at substantially steady-state throttle conditions to minimize the occurrence of unwanted upshifts.

2. Description of the Prior Art

Fully and partially automated vehicular mechanical transmission systems are known in the prior art, as may be seen by reference to U.S. Pat. Nos. 4,361,060; 4,595,986; 4,648,290; 4,850,236; 5,109,721; 5,393,276; 5,409,432 and 5,425,284, the disclosures of which are incorporated herein by reference. Such transmissions having an automatic shift mode typically base shift decisions upon shift point profiles or shift schedules, which often are graphically represented on a graph of throttle position (demand) versus engine, output shaft or vehicle speed. It is known to temporarily modify these shift profiles in view of various sensed vehicle operating conditions to modify vehicle performance, for antihunt purposes or the like. Examples of such shift logic may be seen by reference to U.S. Pat. Nos. 4,361,060; 4,551,802; 4,852,006; 4,916,979; 5,053,963 and 5,406,861, the disclosures of which are incorporated herein by reference.

A problem not addressed by the prior art shift logic involves unwanted upshifting which occasionally occurred if the vehicle operator is rapidly changing throttle demand position.

Present demand-based shift point algorithms use instantaneous demand to determine the shift point speeds. In cases of steady-state or slowly varying demand, this provides logical shifting responses to the driver's demands, the shift point is pushed higher for heavy demand and lower for light demand. However, in the case of demand which is changing relatively quickly, this strategy can create shifts which do not follow with what the driver is trying to do.

If the driver is on the throttle but below the upshift point associated with his particular demand and then comes off the throttle, an upshift can be triggered with the present shift strategy as the demand transitions toward 0%. In this case, the driver may have intended to slow down, but the system upshifted. In another case, if the driver is off the throttle and then gets on it, an upshift can be triggered as demand increases. The driver may have wanted more power, but again, the system upshifted. In both cases, responding to a transitory demand level caused the system to upshift when the situation might have been better handled by remaining in place.

As a note, for setting downshift points, the prior art shift point strategy works logically based upon instantaneous demand. Increasing throttle is more likely to produce a downshift to provide more power, and decreasing throttle is more likely to hold the present gear for better fuel economy.

SUMMARY OF THE INVENTION

In accordance with the present invention, a new and improved automated change-gear shift control, including improved upshift control logic, is provided.

This is accomplished by providing logic rules whereby, under at least certain operating conditions and/or operator actions, the normally utilized upshift schedule is modified to prevent unwanted upshifts. By way of example, at relatively low transmission output shaft or engine speeds, upshifts are not commanded until operator-set throttle pedal position becomes relatively steady.

Accordingly, it is an object of the present invention to provide a new and improved automated change-gear transmission shift control system/method.

This and other objects and advantages of the present invention will become apparent from a reading of the following description of the preferred embodiment taken in connection with the attached drawings.

DESCRIPTION OF THE PREFERRED EMBODIMENT

Figure 1:
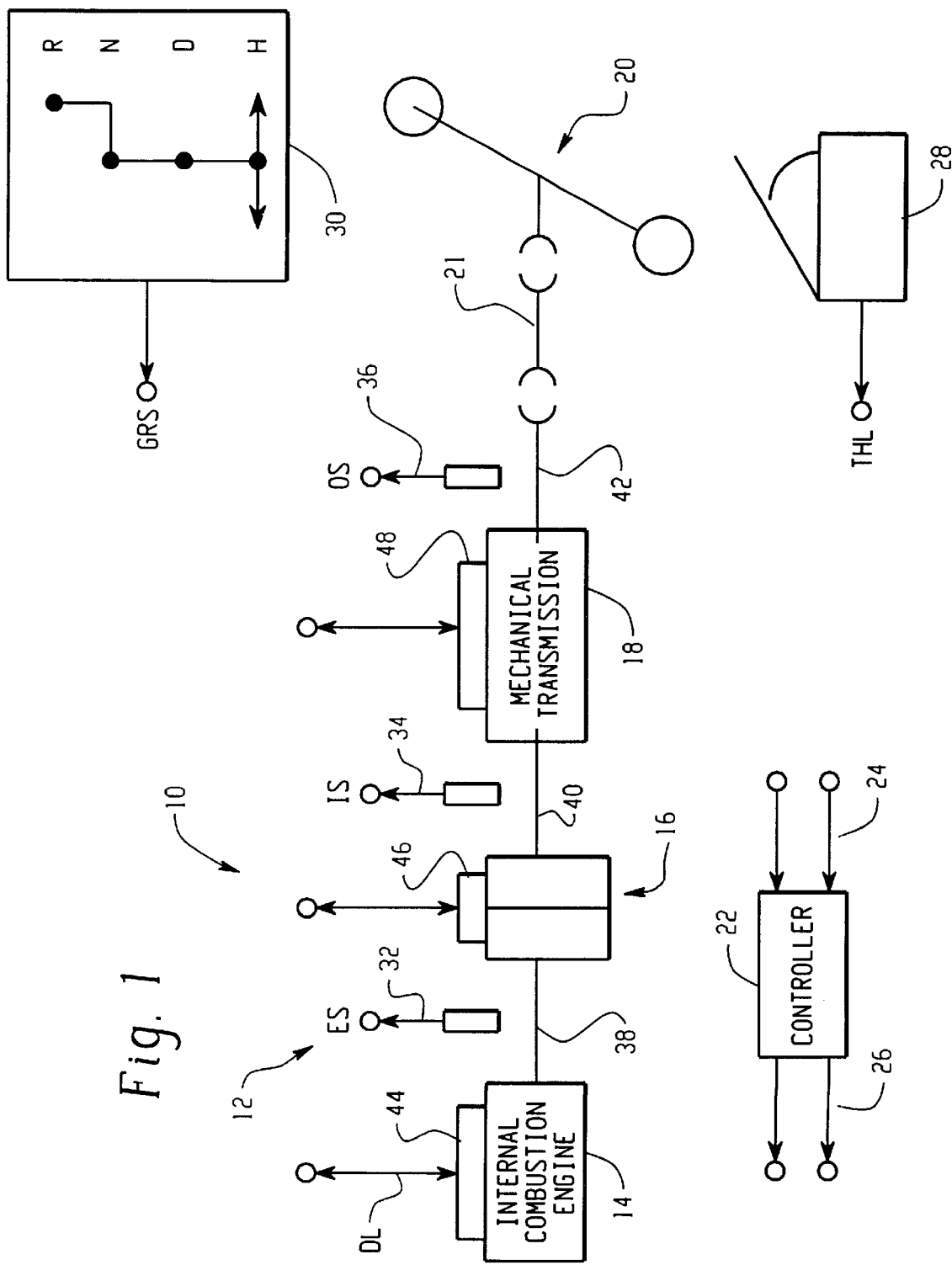
FIG. 1 is a schematic illustration of an at least partially automated vehicular mechanical transmission system utilizing the control logic of the present invention.

FIG. 1 illustrates a vehicle powertrain 10 including an at least partially automated mechanical transmission system 12 utilizing the upshift control logic of the present invention. Powertrain 10 includes an internal combustion engine 14 (such as a gasoline or diesel engine), a master clutch 16, a mechanical transmission 18, and a drive axle assembly 20 driven by propeller shaft 21. While the present invention is particularly well suited for medium- and heavy-duty vehicles, it is not so limited.

Transmission 18 may be of a standard 5-, 6-, 7-, 9-, 10-, 12- or greater forward speed design. Examples of such transmissions may be seen by reference to U.S. Pat. Nos. 4,373,403; 4,754,665; and 5,390,561, the disclosures of which are incorporated herein by reference.

The automated transmission system 12 preferably will include a microprocessor-based controller 22 for receiving various input signals 24 and processing same according to logic rules to issue command output signals 26 to various system actuators. Controllers of this type are known, as may be seen by reference to aforementioned U.S. Pat. Nos. 4,361,060 and 4,595,986.

A throttle position sensor 28 provides a signal THL indicative of operator-set throttle position or demand level, a shift selector 30 provides a signal GRS indicative of selected transmission operating mode and/or of a request for an up- or downshift for a currently engaged ratio, speed sensors 32, 34 and 36 provide signals ES, IS and OS, respectively, indicative of the rotational speed of the engine crank shaft 38, the transmission input shaft 40 and the transmission output shaft 42, respectively. Preferably, the sensors will sense, or the controller will calculate, a value d/dt(THL) indicative of the rate of change with respect to time of throttle pedal position or driver's demand.

An engine controller 44 is provided for controlling speed or torque of the engine, a clutch actuator 46 is provided for controlling operation of the master clutch, and a transmission operator 48 is provided to control shifting of the transmission.

The ECU 22 may be separate or integral with the engine controller 44. The various controllers, sensors and/or actuators may communicate over a data bus conforming to an industry standard protocol, such as SAE J-1939 or the like.

Suitable sensors and actuators are known to those of ordinary skill in the art and examples thereof, not intended to be limiting, may be seen by reference to U.S. Pat. Nos. 4,361,060; 4,873,881; 4,974,468; 5,135,218; 5,279,172; 5,305,240; 5,323,669; 5,408,898; 5,441,137; 5,445,126; 5,448,483 and 5,481,170.

Figure 2:
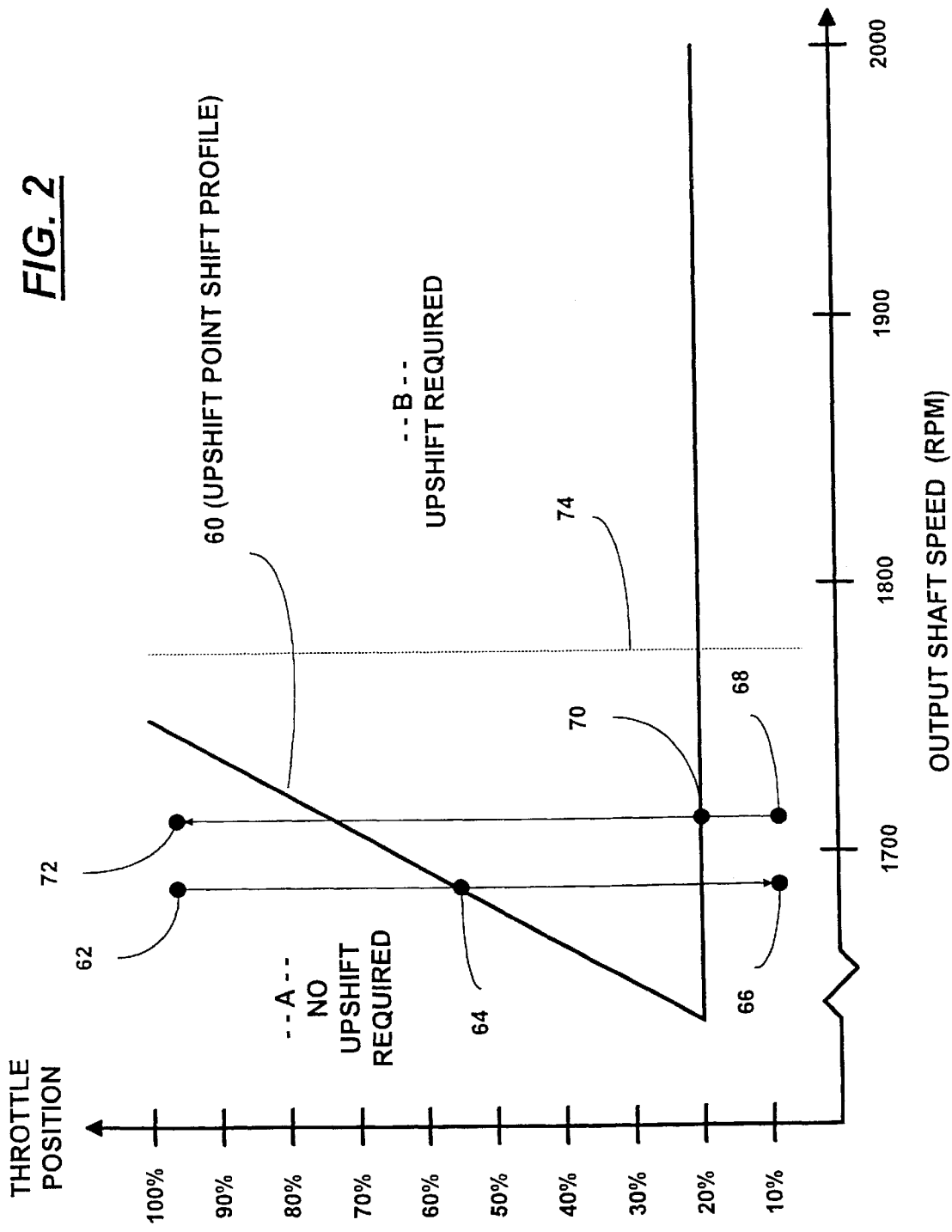
FIG. 2 is a schematic illustration, in graphical format, of a traditional shift schedule illustrating the drawbacks of the prior art.

As is known, in automated transmission systems of this type, when operating in an automatic shifting mode (such as, for a non-limiting example, "D" on selector 30), upshifts and downshifts are commanded according to a "shift schedule" or "shift point profile," a prior art version of which is illustrated in FIG. 2. Shift schedules, or the functional equivalents thereof, typically are stored in the memories of the controllers 22. The present invention also is applicable to those transmission systems wherein only the upper ratios are automated.

FIG. 2 is a typical top-gear upshift shift point profile for a heavy-duty vehicle having a diesel engine and a 10-to-12-forward-speed mechanical transmission. Throttle position, also referred to as driver demand, is plotted against a speed (such as output shaft or engine rotational speed). Line 60 is the upshift point profile and divides the chart into two operating areas, area A where no upshift is required, and area B where upshifts are required. According to the prior art upshift shift logic, an instantaneous crossing of line 60 from area A to area B would immediately result in an upshift being commanded.

The prior art demand-based shift point algorithms use instantaneous demand to determine the shift point speeds. In cases of steady-state or slowly varying demand, this provides logical shifting responses to the driver's demands, the shift point is pushed higher for heavy demand and lower for light demand. However, in the case of demand which is changing relatively quickly, this strategy can create shifts which do not follow with what the driver is trying to do.

If the driver is on the throttle but below the upshift point associated with his particular demand (point 62) and then comes off the throttle, an upshift can be triggered (point 64) with the present shift strategy as the demand transitions toward 0% (point 66). In this case, the driver may have intended to slow down, but the system upshifted. In another case, if the driver is off the throttle (point 68) and then gets on it, an upshift can be triggered as demand increases (point 70). The driver may have wanted more power (point 72), but again, the system upshifted. In both cases, responding to a transitory demand level caused the system to upshift when the situation might have been better handled by remaining in place, i.e., not upshifting.

To minimize such overshifting, the shift logic of the present invention prohibits commanded upshifts until the operator has positioned the throttle pedal in a relatively stable, steady-state condition. This is sensed by the throttle pedal position remaining in an relatively small band of values (within a 5% band, by way of example) and/or the rate of change of throttle position with respect to time being lower than a reference value ($|(d/dt(THL))|<REF-1$). If these conditions are met, upshifts may be commanded in accordance with the position of the current operating condition relative to the shift point profile of FIG. 2.

As may be seen, if speed is in excess of a certain value (REF-2), such as represented by line 74, the logic of the present invention is not necessary, as continued increasing or decreasing of demand will not cause a crossing and recrossing of shift point profile line 60.

As a note, for setting downshift points, the prior art shift point strategy works logically based upon instantaneous demand. Increasing throttle is more likely to produce a downshift to provide more power, and decreasing throttle is more likely to hold the present gear for better fuel economy.

Figure 3:
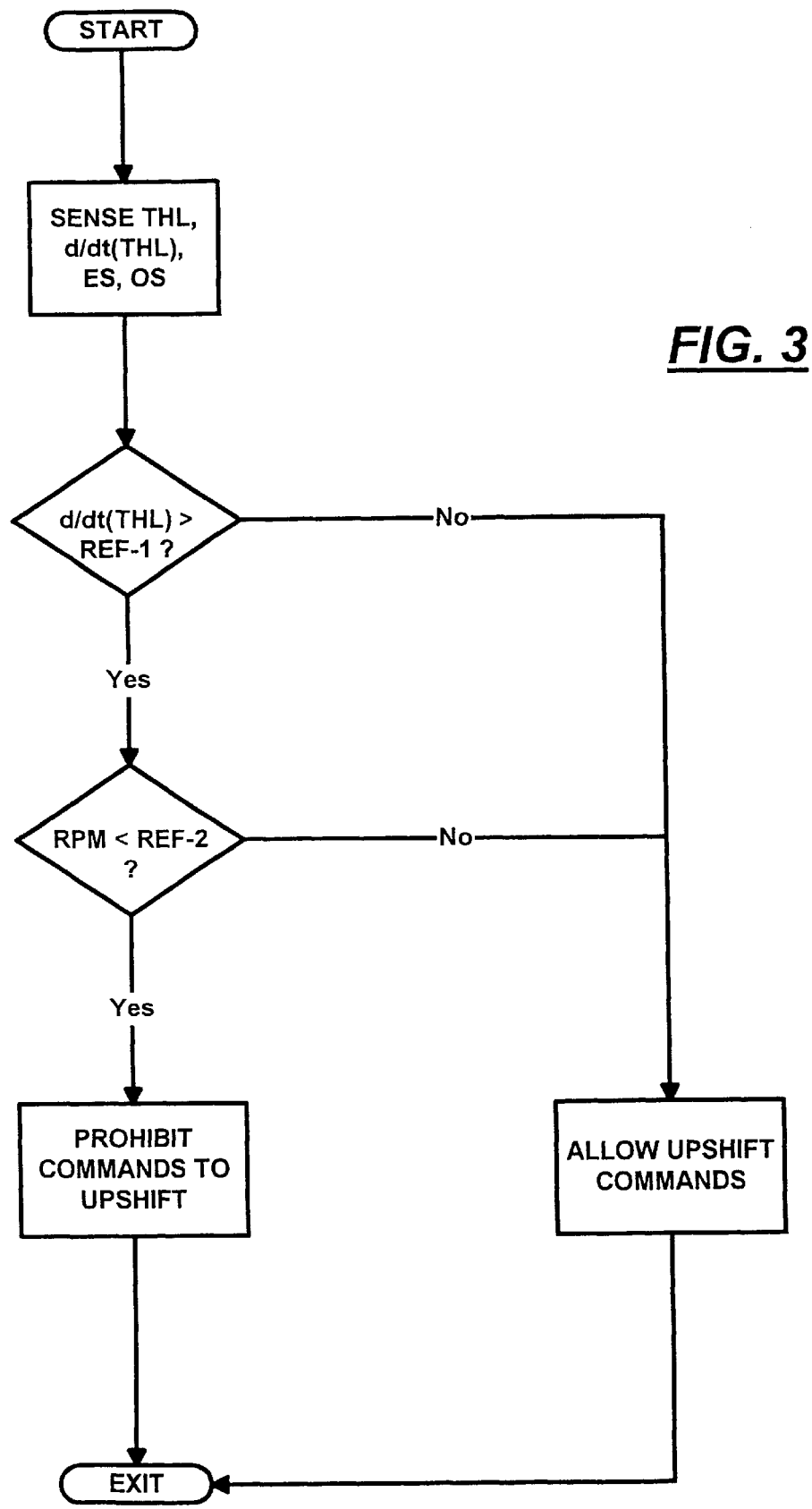
FIG. 3 is a schematic illustration, in flow chart format, of the upshift control logic of the present invention.

FIG. 3 is a flow chart representation of the shift logic modification of the present invention.

Accordingly, it may be seen that a new and improved control system/method for upshifting has been provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling upshifting in a vehicular automated mechanical transmission system comprising a fuel-controlled engine, a manually controlled device for providing a signal indicative of requested engine fueling, and a change-gear transmission having an input shaft driven by said engine and an output shaft, said transmission having a plurality of selectable ratios of input shaft rotational speed to output shaft rotational speed, a controller for receiving a plurality of input signals including (i) a first input signal indicative of the rotational speed of at least one of said engine, input shaft and output shaft, and (ii) a second input signal indicative of the operator's requested engine fueling and for processing said signals in accordance with logic rules to issue command output signals to system actuators, said logic rules causing an upshift to be commanded if at given sensed value of said second input signal, said first signal exceeds an upshift reference value for said given value of said second signal, said method comprising:

determining if the rate of change with respect to time of said second signal is less than a first reference value ($|(d/dt(THL))|<REF-1$); and prohibiting command output signals causing an upshift if said rate of change is greater than said first reference value.

2. The method of claim 1 wherein command output signals causing an upshift are prohibited only if said first signal is less than a second reference value (($OS$, $ES$, $IS$)$<REF-2$) and said rate of change is greater than said first reference value.

3. The method of claim 2 wherein said second reference value is about 1800 RPM.

4. The method of claim 1 wherein said controller is microprocessor-based.

5. The method of claim 1 wherein said first signal is indicative of output shaft rotational speed.

6. The method of claim 1 wherein said first signal is indicative of engine rotational speed.

7. The method of claim 1 wherein said first signal is read by said controller from an electronic data link.

8. An improved method for controlling an automatic transmission system comprising a throttle-controlled engine, an operator-actuated throttling control means, and a transmission having a plurality of gear ratio combinations selectively engageable between a transmission input shaft and a transmission output shaft, said transmission input shaft being operatively connected to said engine, said transmission system comprising an information processing unit having means for receiving a plurality of input signals including (i) an input signal indicative of the position of said throttle controlling means and (ii) an input signal indicative of the rotational speed of said engine, said processing unit including means for processing said input signals in accordance with a program to provide a predetermined gear ratio for a given combination of input signals and for generating output signals whereby said transmission system is operated in accordance with said program, and actuators associated with said transmission effective to actuate said transmission to effect engagement of one of said gear ratio combinations in response to said output signals from said processing unit, the improved method comprising:

determining the rate of change with respect to time of said input signal indicative of the position of said throttle controlling means;

comparing said rate of change to a reference value;

determining the presence of a steady-state value for said input signal if said reference value exceeds said rate of change; and modifying said program by prohibiting upshifting in the absence of a steady-state value for said input signal indicative of the position of said throttle controlling means.

9. A control system for controlling upshifting in a vehicular automated mechanical transmission system (12) comprising a fuel-controlled engine (14), a manually controlled device for providing a signal indicative of requested engine fueling (28), and a change-gear transmission (18) having an input shaft (40) driven by said engine and an output shaft (42), said transmission having a plurality of selectable ratios of input shaft rotational speed to output shaft rotational speed, a controller (22) for receiving a plurality of input signals (24) including (i) a first input signal (ES, IS, OS) indicative of the rotational speed of at least one of said engine, input shaft and output shaft, and (ii) a second input signal (THL) indicative of the operator's requested engine fueling and for processing said signals in accordance with logic rules to issue command output signals (26) to system actuators (44, 46 and/or 48), said logic rules causing an upshift to be commanded if at given sensed value of said second input signal, said first signal exceeds an upshift reference value for said given value of said second signal, said control system characterized by said logic rules including rules for:

determining if the rate of change with respect to time of said second signal is less than a first reference value ($|(d/dt(THL))|<REF-1$); and prohibiting command ouptut signals causing an upshift if said rate of change is greater than said first reference value.

10. The control system of claim 9 wherein command output signals causing an upshift are prohibited only if said first signal is less than a second reference value ((OS, ES, IS)<REF-2) and said rate of change is greater than said first reference value.

* * * * *